(12) United States Patent
Tahara et al.

(10) Patent No.: US 10,819,582 B2
(45) Date of Patent: Oct. 27, 2020

(54) TRAFFIC OPTIMIZATION DEVICE AND TRAFFIC OPTIMIZATION METHOD

(71) Applicant: NEC Corporation, Minato-ku, Tokyo (JP)

(72) Inventors: Mitsuhiro Tahara, Tokyo (JP); Yusuke Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 16/073,431

(22) PCT Filed: Feb. 20, 2017

(86) PCT No.: PCT/JP2017/006041
§ 371 (c)(1),
(2) Date: Jul. 27, 2018

(87) PCT Pub. No.: WO2017/145962
PCT Pub. Date: Aug. 31, 2017

(65) Prior Publication Data
US 2019/0036787 A1   Jan. 31, 2019

(30) Foreign Application Priority Data
Feb. 22, 2016   (JP) .............. 2016-031164

(51) Int. Cl.
*H04L 12/24* (2006.01)
*H04L 29/08* (2006.01)
(Continued)

(52) U.S. Cl.
CPC ........ *H04L 41/142* (2013.01); *H04L 41/0896* (2013.01); *H04L 41/5019* (2013.01);
(Continued)

(58) Field of Classification Search
CPC .............. H04L 41/142; H04L 41/0896; H04L 41/5019; H04L 43/16; H04L 43/0876;
(Continued)

(56) References Cited

U.S. PATENT DOCUMENTS

2015/0296505 A1* 10/2015 Luna .................. H04L 67/2847
370/329

FOREIGN PATENT DOCUMENTS

JP       1108840      *  3/1999
JP       1168840   A     3/1999
(Continued)

OTHER PUBLICATIONS

International Search Report dated May 16, 2017 from the International Bureau in counterpart International application No. PCT/JP2017/006041 (Year: 2017).*

(Continued)

*Primary Examiner* — Michael C Lai

(57) ABSTRACT

In order to dynamically vary a pacing threshold and perform pacing control such that there is no bias in the stress applied to a user, a statistical information processing means: acquires statistical information of a mid-communication disconnect in which a user terminal disconnects in the midst of communications, in respect to communications according to an application protocol; calculates a degree of user dissatisfaction for each application protocol on the basis of the statistical information; and manages, for each application protocol, a pacing threshold corresponding to the degree of user dissatisfaction. A call processing means determines a pacing threshold for each application protocol such that communication traffic to a user terminal does not exceed a prescribed band upper limit and the degree of user dissatisfaction of each application protocol is the same, and executes pacing processing such that the communication (Continued)

traffic of each application protocol is below the determined pacing threshold.

12 Claims, 14 Drawing Sheets

(51) Int. Cl.
*H04L 29/06* (2006.01)
*H04L 12/26* (2006.01)

(52) U.S. Cl.
CPC ........ *H04L 43/0876* (2013.01); *H04L 65/605* (2013.01); *H04L 65/607* (2013.01); *H04L 65/80* (2013.01); *H04L 67/143* (2013.01); *H04L 43/16* (2013.01); *H04L 67/02* (2013.01); *H04L 67/04* (2013.01); *H04L 69/163* (2013.01); *H04L 69/329* (2013.01)

(58) Field of Classification Search
CPC ..... H04L 65/605; H04L 65/607; H04L 65/80; H04L 67/02; H04L 67/04; H04L 67/143; H04L 69/163; H04L 69/329
See application file for complete search history.

(56) References Cited

FOREIGN PATENT DOCUMENTS

| | | | |
|---|---|---|---|
| JP | 2003224588 | * | 8/2003 |
| JP | 2003224588 A | | 8/2003 |
| JP | 2011155600 | * | 8/2011 |
| JP | 2011155600 A | | 8/2011 |
| JP | 2015154395 | * | 8/2015 |
| JP | 2015154395 A | | 8/2015 |

OTHER PUBLICATIONS

Katsumoto, K., et at., "A Bandwidth Assignment Method with Utility Maximization for Time Constrained File Transfer", The Institute of Electronics, Information and Communication Engineers, 2014, vol. 113, pp. 127-132 (Year: 2014).*

International Search Report dated May 16, 2017 from the International Bureau in counterpart International application No. PCT/JP2017/006041.

Katsumoto, K., et al., "A Bandwidth Assignment Method with Utility Maximization for Time Constrained File Transfer", The Institute of Electronics, Information and Communication Engineers, 2014, vol. 113, pp. 127-132.

* cited by examiner

Fig. 8

MID-COMMUNICATION DISCONNECT RATIO MANAGEMENT TABLE

| PROTOCOL NAME | PACING THRESHOLD | MID-COMMUNICATION DISCONNECT RATIO |
|---|---|---|
| HTTP | -(WITHOUT PACING CONTROL) | 10% |
| HTTP | 500kbps | 30% |
| HTTPS | - | 5% |
| HTTPS | 1Mbps | 40% |
| FTP | - | 6% |
| FTP | 2Mbps | 16% |

Fig. 10

USER DISSATISFACTION DEGREE TABLE

| DEGREE OF USER DISSATISFACTION | PROTOCOL | | |
|---|---|---|---|
| | HTTP | FTP | HTTPS |
| 10 | 1.5Mbps | 2Mbps | 2.4Mbps |
| 15 | 1Mbps | 1.8Mbps | 2Mbps |
| 20 | 500kbps | 1.6Mbps | 1.5Mbps |
| 25 | 300kbps | 1.4Mbps | 1.3Mbps |
| 30 | 200kbps | 1.2Mbps | 1.1Mbps |
| 35 | 150kbps | 1Mbps | 1Mbps |

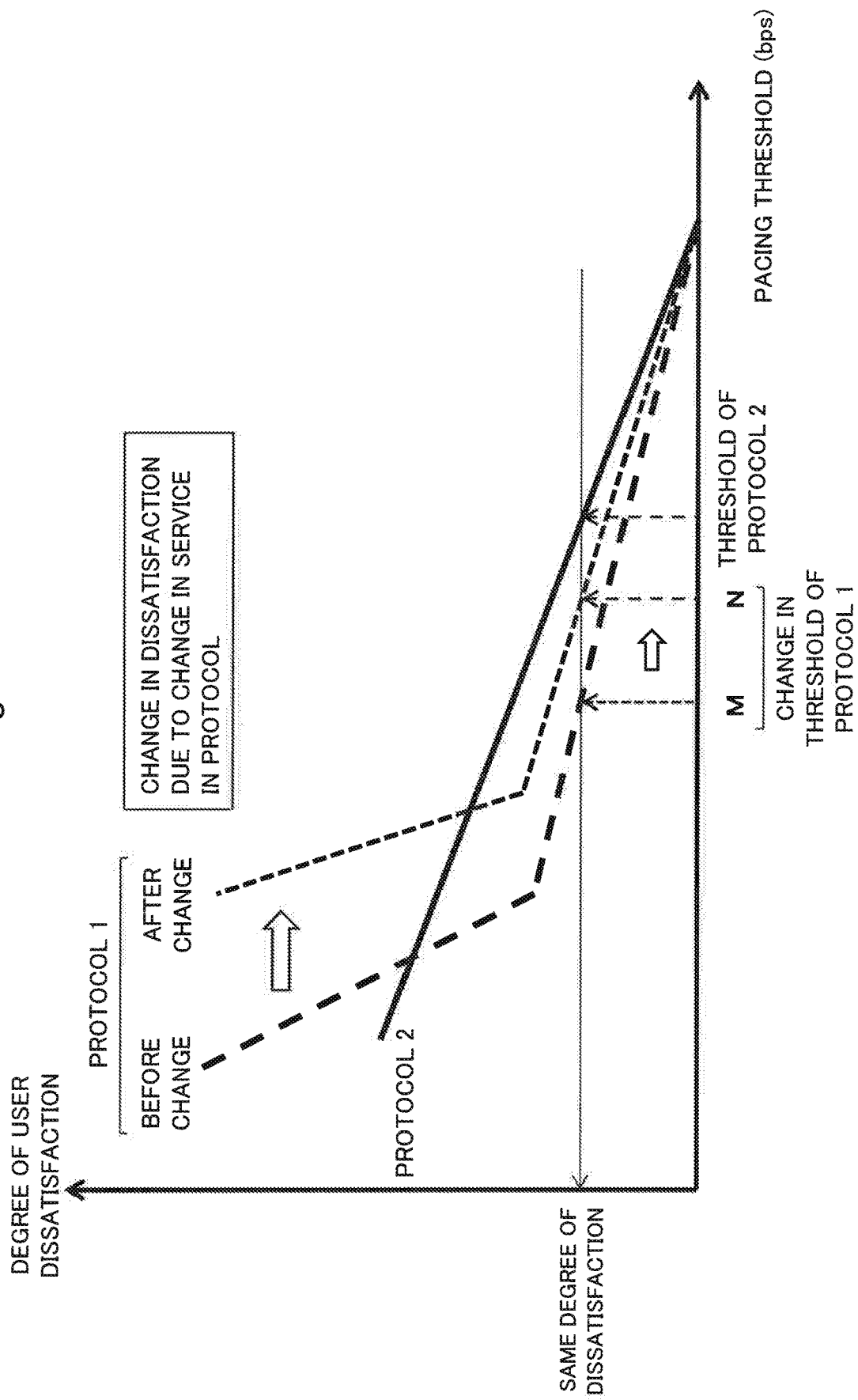

TRAFFIC OPTIMIZATION DEVICE AND TRAFFIC OPTIMIZATION METHOD

This application is a National Stage Entry of PCT/JP2017/006041 filed on Feb. 20, 2017, which claims priority from Japanese Patent Application 2016-031164 filed on Feb. 22, 2016, the contents of all of which are incorporated herein by reference, in their entirety.

TECHNICAL FIELD

The present invention relates to a traffic optimization device and a traffic optimization method, and more particularly, to a traffic optimization device and a traffic optimization method that execute pacing processing for each protocol on the basis of statistical information reflecting user behavior.

BACKGROUND ART

Pacing is a technology for smoothing traffic by suppressing burst traffic by controlling a frequency of transmitting a packet, and improving efficiency of using a network.

For example, in a switch that collectively outputs traffic input from a plurality of links as one link, input of burst traffic causes a buffer overflow, and therefore a packet loss occurs. Thus, pacing controls an amount of transmission data in such a way that the amount does not exceed a band of a predetermined threshold, and therefore occurrence of congestion on a path on the way in a network can be prevented, and efficiency of using the network can be improved. Timing at which transmission of each packet starts needs to be accurately controlled in order to suppress burst traffic by pacing and prevent a buffer overflow on the way of the path. Then, pacing precisely controls a transmission band in such a way that an amount of communication data does not exceed a predetermined band even in an extremely short period of time.

PTL1 discloses a video rate conversion device that controls a flow rate of packets of a video file flowing from a server to a user terminal.

PTL 1 discloses the video rate conversion device that performs pacing processing in which a reproduction speed of a video file in the user terminal keeps up with a download speed of the video file from the server at a value lower by a predetermined value.

For example, with a download speed of "10", a pacing unit of the video rate conversion device disclosed in PTL 1 lowers the download speed in such a way as to be closer to a predetermined value like "5" when a reproduction speed is greatly different like "4". Then, when the download speed is lowered to "3" slower than the reproduction speed of "4", the pacing unit performs following control in such a way as to lower the reproduction speed to "2" slower than the download speed of "3".

PTL 2 discloses a communication control device that appropriately controls communication quality of a plurality of applications during execution in a terminal connected to a communication network depending on a use state of the communication network.

Communication quality required for each application is different, and thus the communication control device disclosed in PTL 2 appropriately controls communication quality such as a communication band, a delay time, and a discard rate being different among applications during execution, and thereby improves physical feeling quality of a communication service.

This communication control device estimates communication quality necessary for each application depending on an execution situation of the application, and controls modifications of a communication band, a delay time, a discard rate, and the like depending on a degree of priority and a network resource of the application.

CITATION LIST

Patent Literature

[PTL 1] Japanese Unexamined Patent Application Publication No. 2015-154395
[PTL 2] Japanese Unexamined Patent Application Publication No. 2011-155600

SUMMARY OF INVENTION

Technical Problem

Pacing operates to limit a use band of traffic between the same terminal and server in such a way that the use band does not exceed a predetermined pacing threshold. Then, the pacing threshold is normally set to be fixed.

Thus, a moving image may frequently stop during playback in a user terminal with a pacing threshold set to be fixed in an environment in which a moving image used in streaming playback achieves high image quality and an amount of data tends to increase. In such a case, a network provider needs to continuously investigate a trend of a moving image content distributed on the Internet and set a required pacing threshold again as appropriate.

Further, since application protocols generally vary in a content of a service, dissatisfaction of a user using a specific service may abruptly increase when pacing is performed with the same pacing threshold.

For example, a protocol like a file transfer protocol (FTP) used to download a massive amount of data has a download speed lowered by a decrease in a use band. Thus, it is expected that a stress felt by a user increases in proportion to a reduction of a use band by pacing. On the other hand, a protocol like a hyper text transfer protocol (HTTP) used in streaming playback of a moving image does not cause a high stress felt by a user as long as a distribution rate greater than or equal to a bit rate of the moving image is secured. However, when a use band is reduced by pacing and a distribution rate decreases below a bit rate of a moving image, the moving image repeatedly stops during playback, and therefore it is expected that a user's stress abruptly increases.

Therefore, control is required to cause setting of a pacing threshold to suit a change in the market and dynamically set a pacing threshold without a bias in a stress applied to each of users using different application protocols.

Neither PTL 1 nor PTL 2 disclose that control is performed to dynamically set a pacing threshold without a bias in a stress applied to each of users using different application protocols.

The present invention provides a traffic optimization device and a traffic optimization method that perform control to dynamically set a pacing threshold without a bias in a stress applied to each of users using different application protocols.

Solution to Problem

To achieve the above object, a traffic optimization device according to an aspect of the present invention comprises:

statistical information processing means for acquiring statistical information about a mid-communication disconnect in which a user terminal disconnects communication by an application protocol in a midst of communication, calculating a degree of user dissatisfaction with each application protocol, based on the statistical information, and managing a pacing threshold corresponding to the degree of user dissatisfaction for each application protocol; and call processing means for determining a pacing threshold for each of the application protocols in such a way that communication traffic to the user terminal does not exceed a predetermined band upper limit and the degree of user dissatisfaction with each application protocol is identical, and executing pacing processing in such a way that the communication traffic for each of the application protocols is below the determined pacing threshold.

A traffic optimization method according to another aspect of the present invention comprises: acquiring statistical information about a mid-communication disconnect in which a user terminal disconnects communication by an application protocol in a midst of communication; calculating a degree of user dissatisfaction with each application protocol, based on the statistical information, and managing a pacing threshold corresponding to the degree of user dissatisfaction for each application protocol; determining a pacing threshold for each of the application protocols in such a way that communication traffic to the user terminal does not exceed a predetermined band upper limit and the degree of user dissatisfaction with each application protocol is identical; and executing pacing processing in such a way that the communication traffic for each of the application protocols is below the determined pacing threshold.

Advantageous Effect of Invention

The present invention is able to perform control to dynamically set a pacing threshold without a bias in a stress applied to each of users using different application protocols.

BRIEF DESCRIPTION OF DRAWINGS

FIG. 8 is a diagram exemplifying a content of the mid-communication disconnect ratio management table.

FIG. 10 is a diagram exemplifying a content of the user dissatisfaction degree table.

FIG. 14 is a diagram for describing a situation where a pacing threshold needed to be set is changed with a change in a service in a protocol.

EXAMPLE EMBODIMENT

Figure 1:
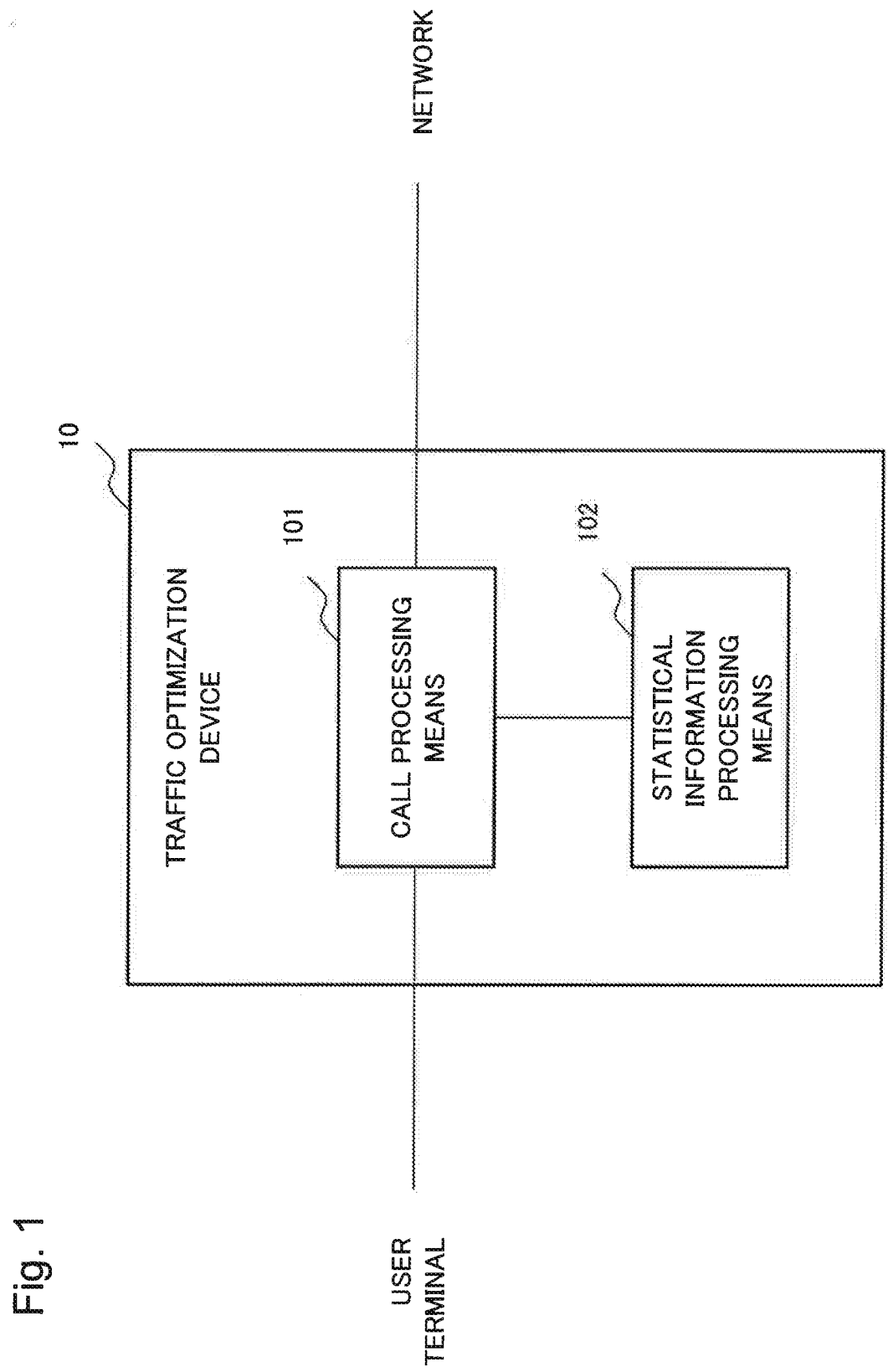
FIG. 1 is a block diagram exemplifying a configuration of a traffic optimization device according to a first example embodiment of the present invention.

Example embodiments of the present invention will be described below in detail with reference to drawings.

Note that, the example embodiments are illustrative, and the disclosed device, method, and the like are not limited to the configuration of the example embodiments below. Further, reference signs provided to the drawings are provided as one example to facilitate understanding for the sake of convenience and are not intended for any limitation. Moreover, a direction of an arrow in the drawings illustrates only one example and does not limit a direction of a signal between blocks.

First Example Embodiment

FIG. 1 is a block diagram exemplifying a configuration of a traffic optimization device according to a first example embodiment of the present invention.

A traffic optimization device 10 according to the first example embodiment includes a call processing means 101 and a statistical information processing means 102.

The statistical information processing means 102 acquires statistical information about a mid-communication disconnect in which a user terminal disconnects from communication by an application protocol in the midst of communication, and calculates a degree of user dissatisfaction of each application protocol on the basis of the statistical information. Then, the statistical information processing means 102 manages, for each application protocol, a pacing threshold corresponding to the degree of user dissatisfaction.

The call processing means 101 determines a pacing threshold for each application protocol in such a way that communication traffic to the user terminal does not exceed a predetermined band upper limit and the degree of user dissatisfaction of each application protocol is the same. Then, the call processing means 101 executes pacing processing in such a way that the communication traffic of each application protocol is below the determined pacing threshold.

Figure 2:
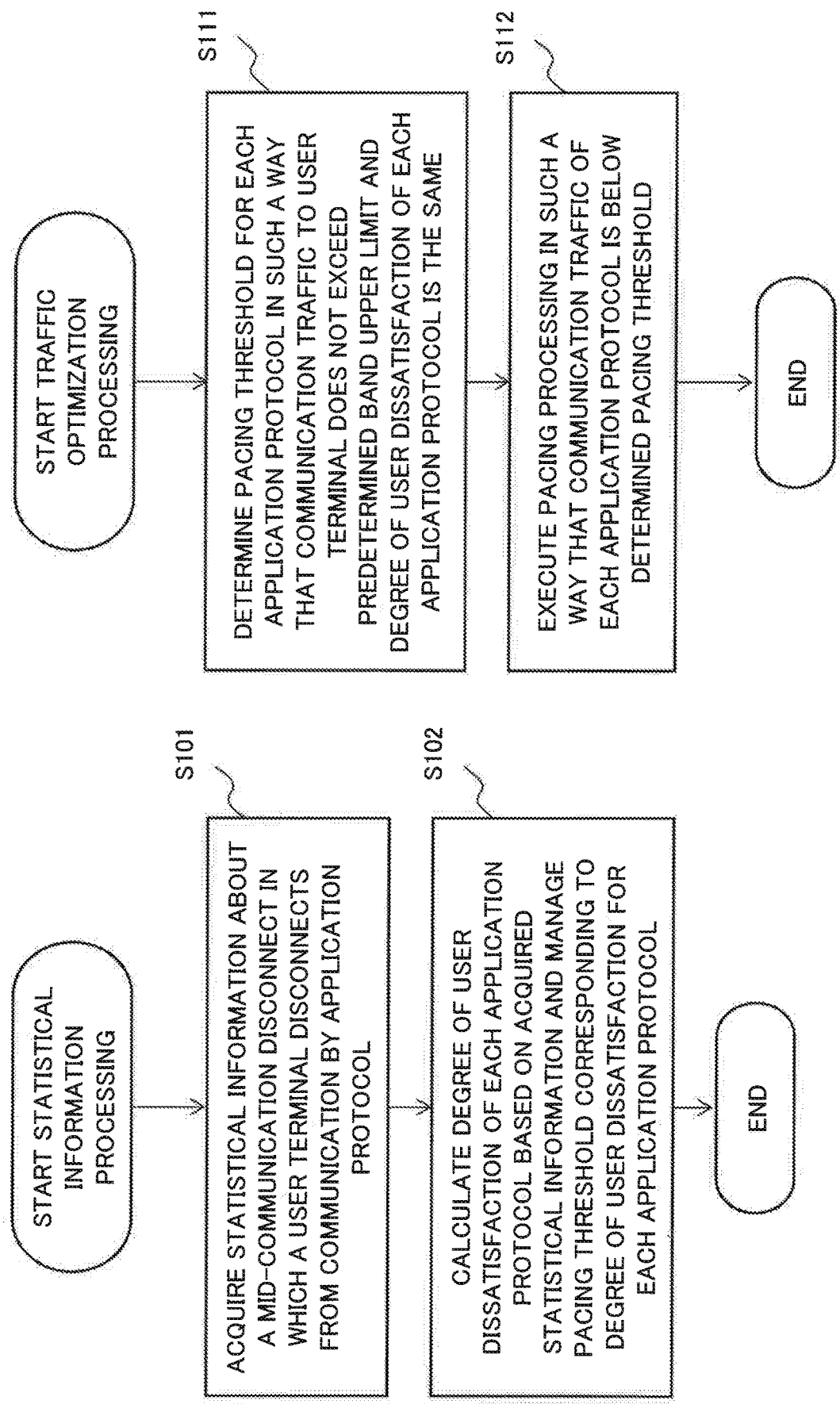
FIG. 2 is a flowchart exemplifying operations of a traffic optimization method according to the first example embodiment of the present invention.

FIG. 2 is a flowchart exemplifying operations of a traffic optimization method according to the first example embodiment of the present invention. The traffic optimization method according to the first example embodiment is executed by the following operations performed by the traffic optimization device.

The traffic optimization method according to the first example embodiment includes statistical information processing and traffic optimization processing. Steps S101 and S102 in FIG. 2 indicate the statistical information processing, and Steps S111 and S112 indicate the traffic optimization processing.

The statistical information processing operates as follows.

The statistical information processing acquires statistical information about a mid-communication disconnect in which a user terminal disconnects from communication by an application protocol in the midst of communication (S101).

The statistical information processing calculates a degree of user dissatisfaction of each application protocol on the basis of the statistical information, and manages, for each application protocol, a pacing threshold corresponding to the degree of user dissatisfaction (S102).

Further, the traffic optimization processing operates as follows.

The traffic optimization processing determines a pacing threshold for each application protocol in such a way that communication traffic to a user terminal does not exceed a predetermined band upper limit and the degree of user dissatisfaction of each application protocol is the same (S111).

The traffic optimization processing executes pacing processing in such a way that the communication traffic of each application protocol is below the determined pacing threshold (S112).

As described above, in the present example embodiment, a degree of user dissatisfaction obtained by statistically processing abandonment in the midst of communication by the user terminal is calculated and converted into numbers. Furthermore, a pacing threshold corresponding to the degree of user dissatisfaction is managed for each application protocol. Then, a pacing threshold for each application is determined by using the degree of user dissatisfaction. At this time, a pacing threshold is determined for each application protocol in such a way that communication traffic to the user terminal does not exceed a predetermined band upper limit and the degree of user dissatisfaction of each application protocol is the same. Pacing control is executed in such a way that the communication traffic of each application protocol is below the determined pacing threshold by using the pacing threshold determined for each application protocol.

Thus, in the present example embodiment, control can be performed to dynamically set a pacing threshold without a bias in a stress applied to each of users using different application protocols.

Second Example Embodiment

A second example embodiment will be described with reference to FIGS. 3 to 14.

Figure 3:
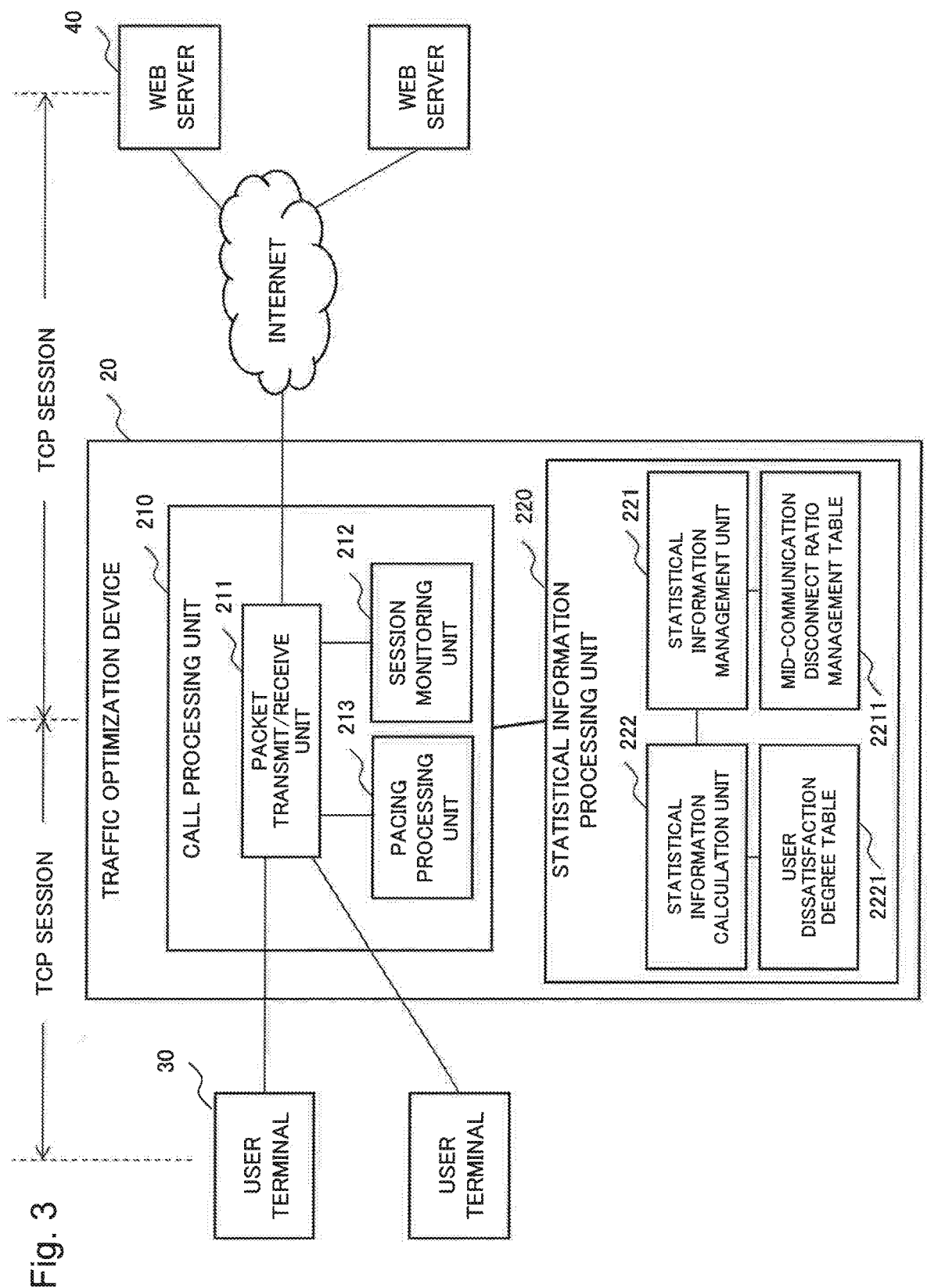
FIG. 3 is a block diagram exemplifying a configuration of a traffic optimization device according to a second example embodiment of the present invention.

FIG. 3 is a block diagram exemplifying a configuration of a traffic optimization device according to the second example embodiment of the present invention.

A traffic optimization device 20 is installed in, for example, a communication network provided by a mobile data communication carrier or an Internet service provider (ISP). The traffic optimization device 20 is located between a user terminal 30 in the communication network and a Web server 40 on the Internet, and optimizes an amount of traffic flowing between the user terminal 30 and the Web server 40.

For example, when the communication network is an MVNO that borrows a wireless communication infrastructure from an MNO and provides a service, the traffic optimization device 20 optimizes a use band not to exceed a predetermined upper limit with reference to a contract band with the MNO. Note that, the MNO is an abbreviation of a "Mobile Network Operator", and is a carrier that has a wireless communication infrastructure on its own and provides a communication service. The MVNO is an abbreviation of a "Mobile Virtual Network Operator".

The traffic optimization device 20 includes a call processing unit 210 and a statistical information processing unit 220.

The call processing unit 210 is a processing unit that executes call processing related to communication between the user terminal 30 and the Web server 40, and includes a packet transmit-receive unit 211, a session monitoring unit 212, and a pacing processing unit 213.

The packet transmit-receive unit 211 transmits and receives a packet between the user terminal 30 and the Web server 40.

The session monitoring unit 212 monitors setting of a Transmission Control Protocol (TCP) session between the user terminal 30 and the Web server 40 and a disconnect therefrom.

The pacing processing unit 213 determines a pacing threshold described later, and executes pacing processing in such a way that an amount of traffic passing through the traffic optimization device 20 does not exceed a predetermined upper limit.

Further, the statistical information processing unit 220 is a processing unit that accumulates and manages statistical information needed to determine a pacing threshold necessary for the traffic optimization processing, and includes a statistical information management unit 221 and a statistical information calculation unit 222.

The statistical information management unit 221 includes a mid-communication disconnect ratio management table 2211 described later, and collects and accumulates information about a mid-communication disconnect for each application protocol.

The statistical information calculation unit 222 calculates a degree of user dissatisfaction for each application protocol on the basis of information about a mid-communication disconnect for each application protocol accumulated in the mid-communication disconnect ratio management table 2211. The calculated degree of user dissatisfaction is associated with a pacing threshold for each application protocol and managed in a user dissatisfaction degree table 2221 described later.

Note that an application protocol may also be simply referred to as a protocol in the following description.

First, a degree of user dissatisfaction will be described with reference to FIGS. 4 and 5.

Figure 4:
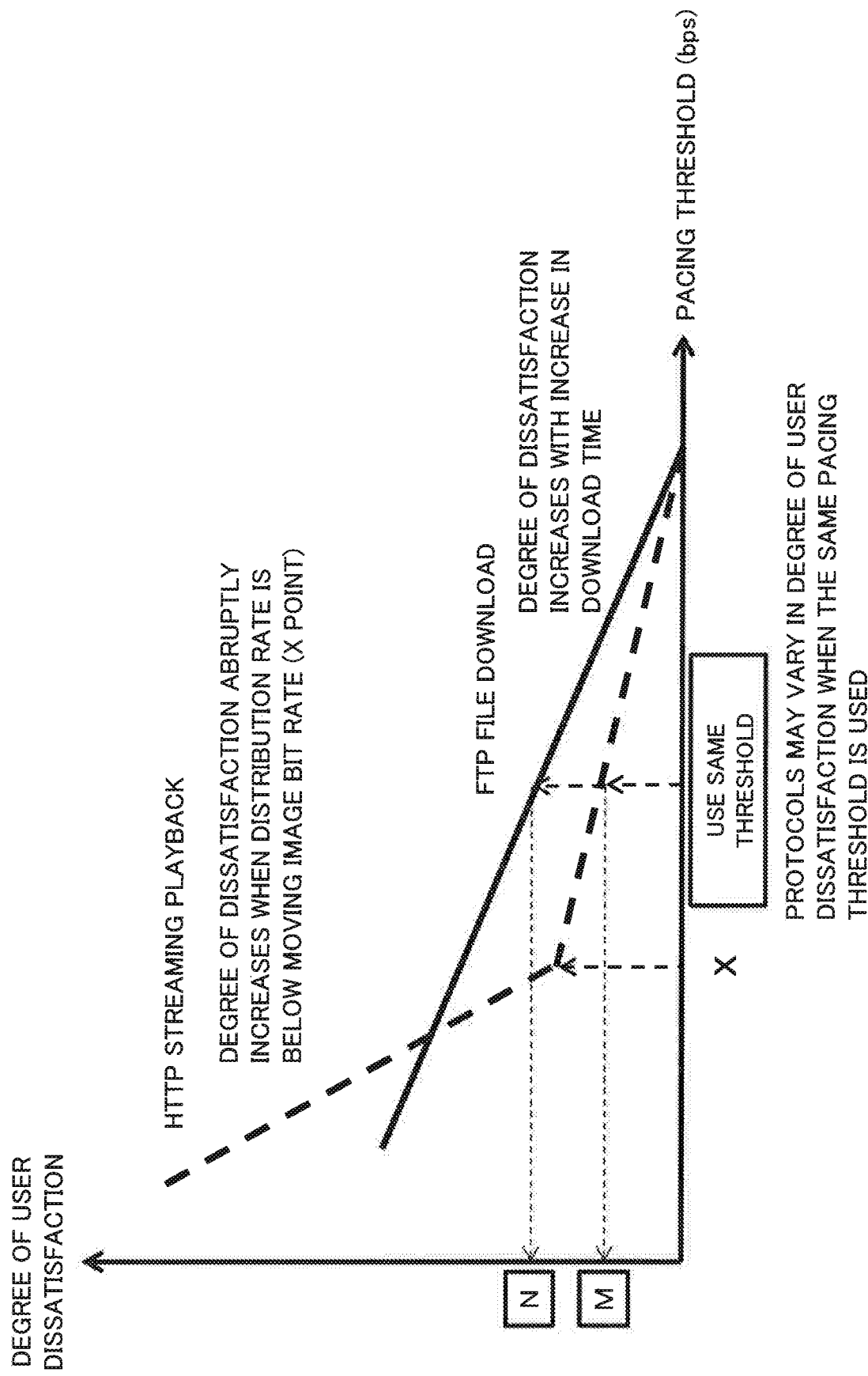
FIG. 4 is a diagram for describing a relationship between a pacing threshold and a degree of user dissatisfaction in each application protocol.

FIG. 4 is a diagram for describing a relationship between a pacing threshold and a degree of user dissatisfaction in each application protocol.

Assuming that the horizontal axis is a pacing threshold and the vertical axis is a degree of user dissatisfaction, FIG. 4 illustrates a situation where a pacing threshold set further in the left direction of the drawing reduces a usable band, thereby increasing a degree of user dissatisfaction. In other words, the pacing threshold defines an upper limit of throughput of data transmitted to the user terminal 30, and less throughput increases a degree of user dissatisfaction.

Further, FIG. 4 illustrates an example in which the same pacing threshold is used for HTTP streaming playback and an FTP file download.

Application protocols vary in a content of a service, so that there is a difference in a degree of user dissatisfaction between protocols when pacing is performed with the same pacing threshold. For example, in FIG. 4, when the same pacing threshold is used, a degree of user dissatisfaction of the HTTP streaming playback is "M", whereas a degree of user dissatisfaction of the FTP file download is "N".

In addition, dissatisfaction of a user using a specific service may abruptly increase from a certain pacing threshold. For example, FIG. 4 illustrates a situation where a distribution rate decreases below a bit rate of a moving image when a pacing threshold is below "X" in the HTTP streaming playback, and therefore the moving image repeatedly stops during playback, and a degree of user dissatisfaction abruptly increases.

Behaviors when a user feels dissatisfied with a state of a network include a mid-communication disconnect from a session during data reception. For example, when a streaming moving image frequently stops during playback, a user is more likely to give up watching the moving image and disconnect in the midst of a session. Further, when the speed of a file download slows down and downloading takes time, a user is also more likely to give up the download and disconnect in the midst of the download.

Thus, a ratio of the number of sessions disconnected in the midst to the number of connections of the sessions is expected to be highly correlated with a degree of user dissatisfaction.

Assuming the ratio of the mid-communication disconnects from the sessions as a degree of user dissatisfaction and suppressing the ratio of the mid-communication disconnects to a minimum can minimize the number of users who feel dissatisfied with a state of a network. Further, the mid-communication disconnect by a user during data reception means that data needed to be transmitted to the user cannot be transmitted. Thus, a common carrier can suppress a decrease in data traffic of the user by suppressing the number of mid-communication disconnects. As a result, this also leads to an increase in an average revenue per user (APRU) that is monthly sales per one user contract of the common carrier.

In this way, the ratio of the mid-communication disconnects from the sessions is assumed to be a degree of user dissatisfaction in the present example embodiment.

Figure 5:
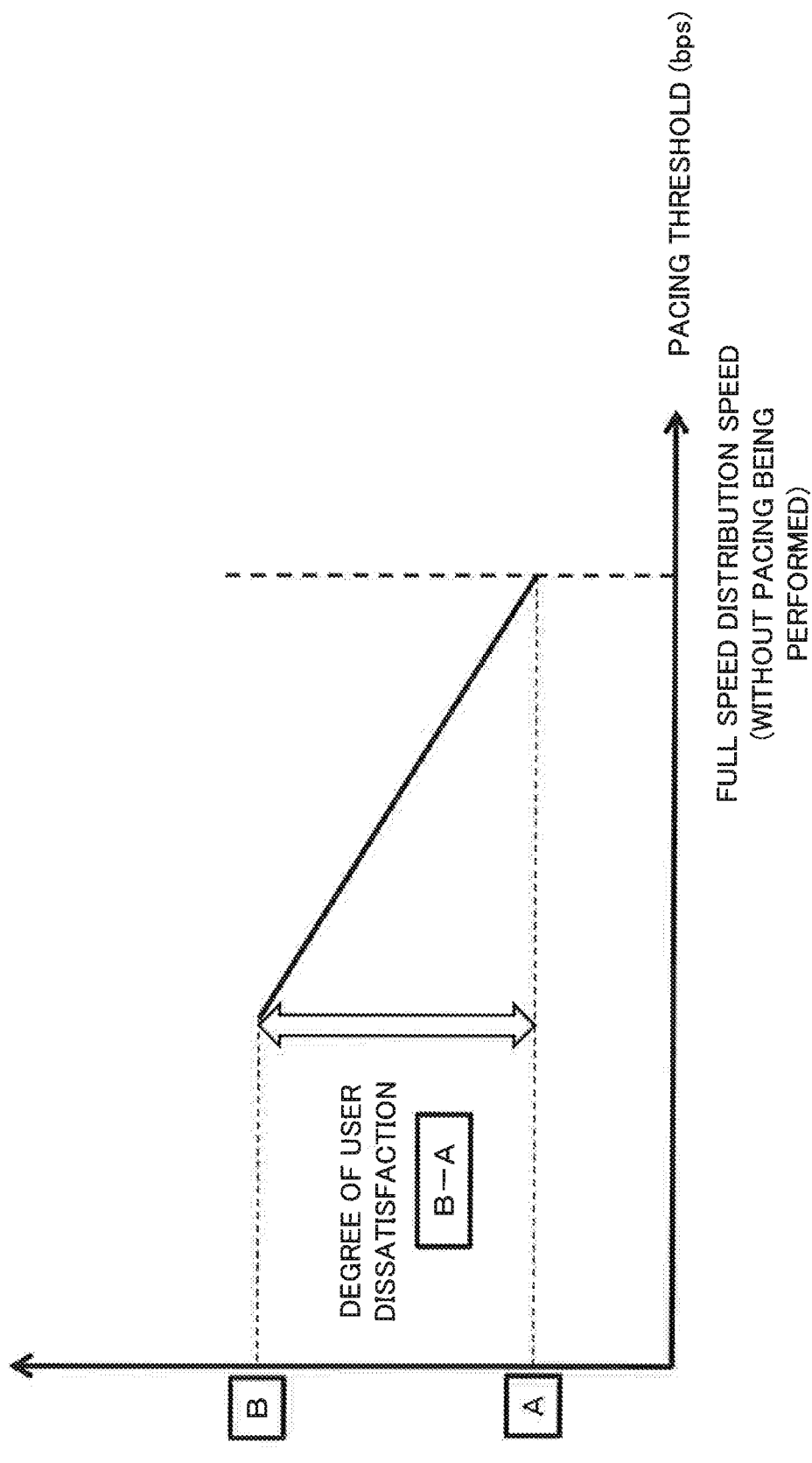
FIG. 5 is a diagram for describing a definition of a degree of user dissatisfaction.

FIG. 5 is a diagram for describing a definition of a degree of user dissatisfaction.

Not only dissatisfaction with a communication state but also behavior of an application being used can cause a mid-communication disconnect from a session. Thus, an influence of an application being used needs to be considered when the ratio of mid-communication disconnects from a session is assumed to be a degree of user dissatisfaction.

The ratio of mid-communication disconnects occurring in a state of non-congestion without pacing being performed (band reduction unperformed state) is measured for each protocol, and the value is assumed to be the ratio of mid-communication disconnects regardless of a communication state. Then, a numerical value excluding the ratio of mid-communication disconnects regardless of a communication state from the ratio of mid-communication disconnects occurring when pacing is performed is regarded as a ratio of mid-communication disconnects due to dissatisfaction with the communication state, and the value is defined as a degree of user dissatisfaction.

In other words, the ratio of mid-communication disconnects regardless of a communication state is "A" in FIG. 5, and the ratio of mid-communication disconnects occurring when pacing is performed is "B". Then, "B"–"A"="a degree of user dissatisfaction".

In this way, the degree of user dissatisfaction is a numerical value excluding the ratio of mid-communication disconnects occurring in the band reduction unperformed state without pacing being performed from the ratio of mid-communication disconnects occurring when a band is reduced to a pacing threshold being a band when pacing processing is applied. The degree of user dissatisfaction is an indicator indicating a degree of user dissatisfaction with a communication state by the pacing threshold when the pacing processing is applied.

The ratio of mid-communication disconnects from sessions and the degree of user dissatisfaction described above are accumulated at any time and managed in the statistical information processing unit 220.

Next, calculation and management of the ratio of mid-communication disconnects from sessions and the degree of user dissatisfaction will be described with reference to FIGS. 6 to 10.

As described above, the ratio of mid-communication disconnects occurring in the state without pacing being performed on each protocol and the ratio of mid-communication disconnects occurring when pacing is performed need to be always grasped in order to calculate the degree of user dissatisfaction. Then, the degree of user dissatisfaction is calculated on the basis of the grasped ratios of mid-communication disconnects.

Figure 6:
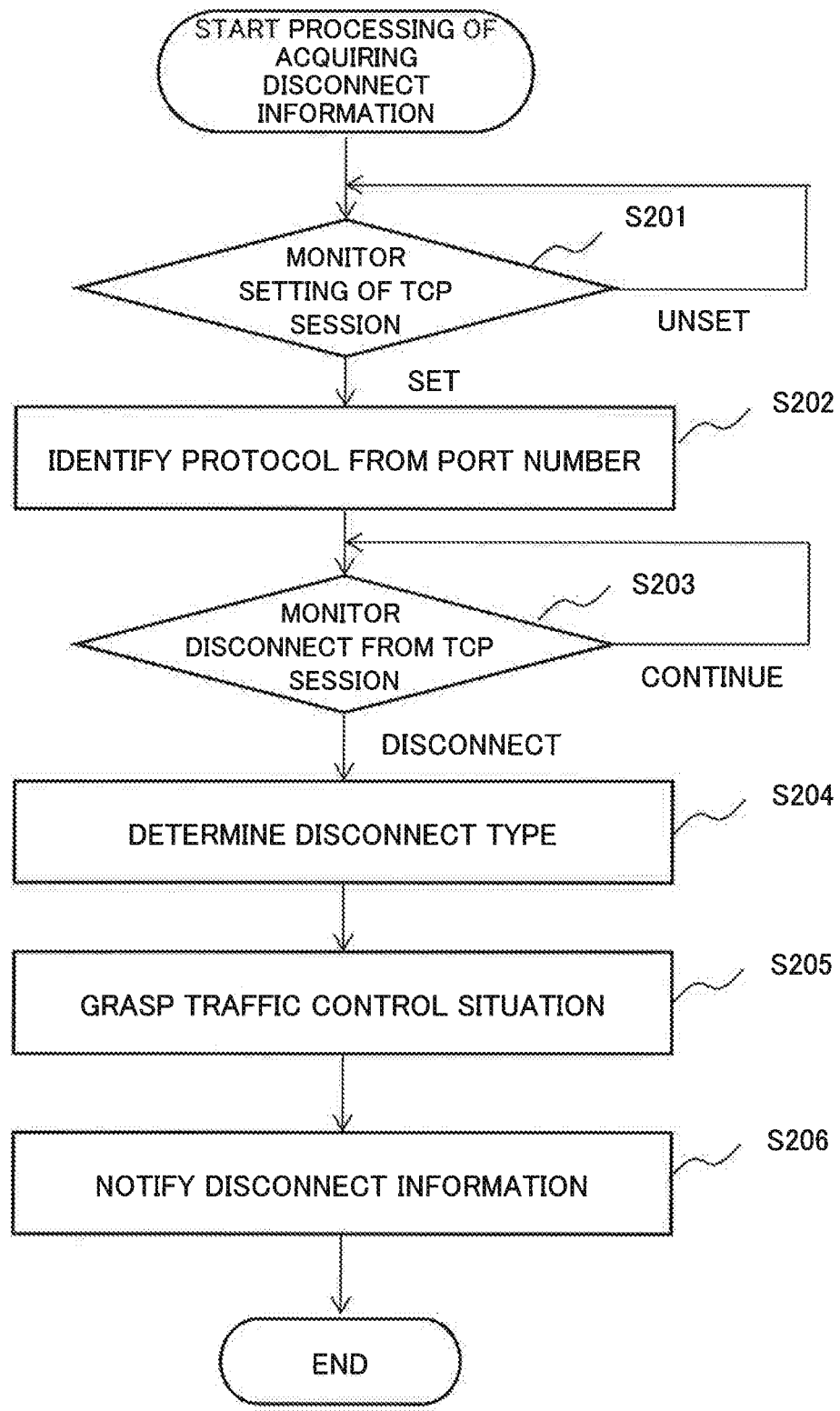
FIG. 6 is a flowchart for describing processing of acquiring disconnect information.

FIG. 6 is a flowchart for describing processing of acquiring disconnect information. This processing is executed by the session monitoring unit 212 of the call processing unit 210.

First, the session monitoring unit 212 of the call processing unit 210 monitoring a TCP session monitors setting of the TCP session by the user terminal 30 (S201).

When the TCP session is set (SET in S201), the session monitoring unit 212 identifies a protocol from a source of a network address of a packet received for the setting and a destination port number (well-known port) (S202). For example, a protocol is identified as an FTP, an HTTP, an HTTPS, and a SFTP respectively from a port number 20, a port number 80, a port number 443, and a port number 22. Note that the HTTPS is an abbreviation of an "HTTPS over SSL/TLS" and is a protocol obtained by encoding the HTTP by a Secure Socket Layer (SSL) and a Transport Layer Security (TLS). Further, the SFTP is an abbreviation of an "SSH File Transfer Protocol" and is an application for performing the FTP by using communication of a Secure Shell (SSH).

Subsequently, the session monitoring unit 212 monitors a disconnect from the set TCP session (S203), and determines, when the set TCP session is disconnected (DISCONNECT in S203), a type of the disconnect (normal disconnect/mid-communication disconnect) (S204).

For example, the session monitoring unit 212 distinguishes between the normal disconnect and the mid-communication disconnect from the TCP session as follows. The session monitoring unit 212 determines, as the normal disconnect, a disconnect from the TCP session in a state where all data transmitted from the Web server 40 have been transmitted to the user terminal 30. On the other hand, the session monitoring unit 212 determines, as the mid-communication disconnect, a disconnect from the TCP session in a state where data transmitted from the Web server 40 are accumulated in a buffer of the packet transmit/receive unit 211 and are not yet transmitted to the user terminal 30.

Furthermore, the session monitoring unit 212 grasps a traffic control situation at the occurrence of the disconnect (S205). The traffic control situation at the occurrence of the disconnect is information indicating whether the disconnect occurring in the state without pacing being performed (band reduction unperformed state) or the disconnect occurring when pacing is performed. For the disconnect occurring when pacing is performed, a pacing threshold when pacing is performed is acquired from the pacing processing unit 213.

When the above-mentioned information is fulfilled, the session monitoring unit 212 notifies the statistical information management unit 221 of the statistical information processing unit 220 of information about the identified protocol, the determined disconnect type, disconnect occurrence time, and the traffic control situation at the occurrence of the disconnect as disconnect information (S206).

Subsequently, processing of generating the mid-communication disconnect ratio management table 221 executed by the statistical information management unit 221 will be described with reference to FIG. 7.

Figure 7:
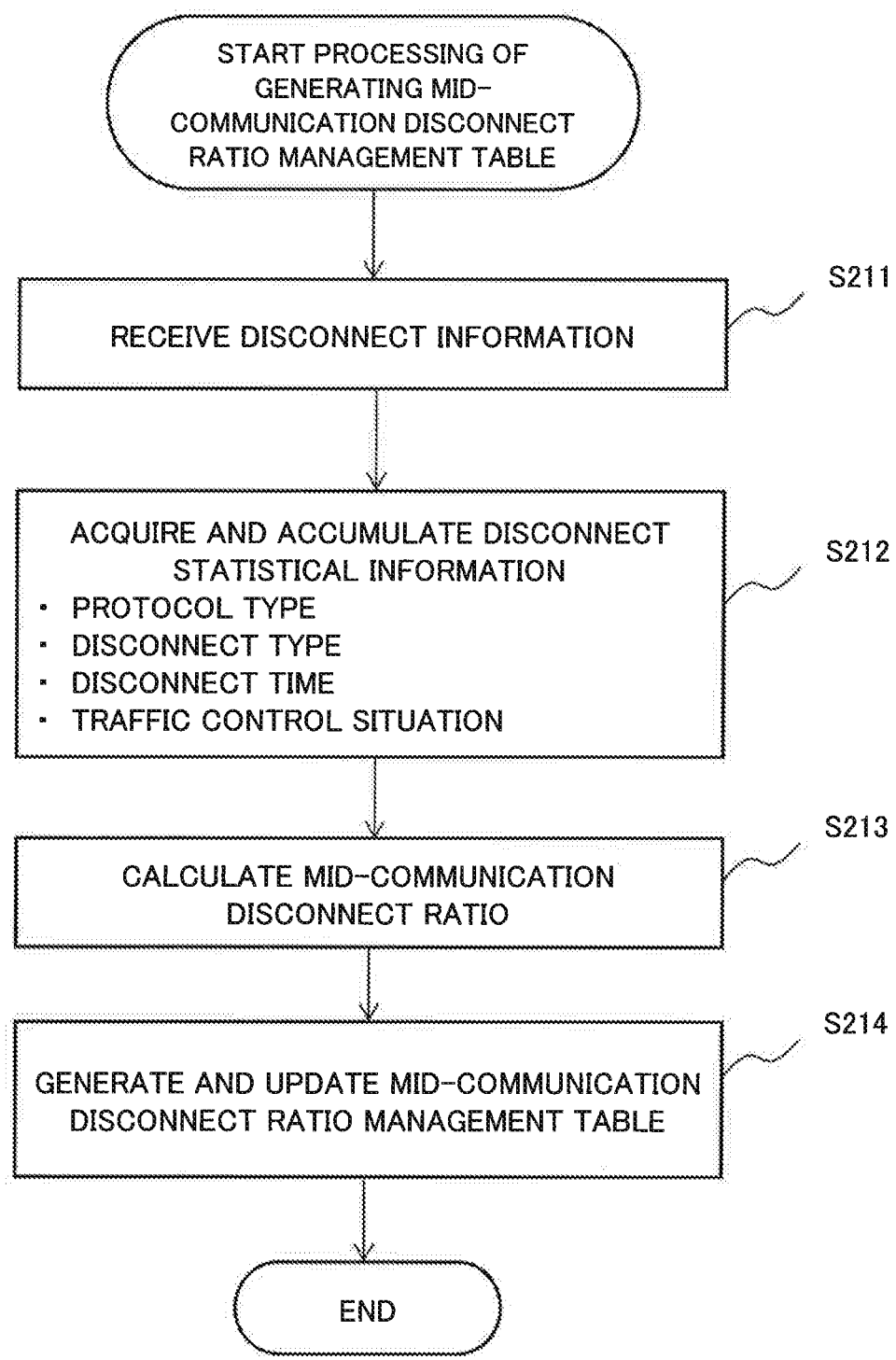
FIG. 7 is a flowchart for describing processing of generating a mid-communication disconnect ratio management table.

FIG. 7 is a flowchart for describing the processing of generating a mid-communication disconnect ratio management table. Then, FIG. 8 is a diagram exemplifying a content of the mid-communication disconnect ratio management table 2211.

The statistical information management unit 221 receives the above-described disconnect information from the session monitoring unit 212 (S211).

In other words, the protocol type, the disconnect type, the disconnect occurrence time, and the traffic control situation at the occurrence of the disconnect are acquired and accumulated in an arbitrary storage unit, which is not illustrated (S212).

The statistical information management unit 221 receives the disconnect information at any time from the session monitoring unit 212 and accumulates the disconnect information. Then, the statistical information management unit 221 calculates, from the accumulated information, a ratio of mid-communication disconnects calculated from a relationship between the number of normal disconnects and the number of mid-communication disconnects occurring in a predetermined period of time (S213), and generates the mid-communication disconnect ratio management table 2211 (S214). For example, "the number of normal disconnects" and "the number of mid-communication disconnects" of connections occurring during a predetermined observation period of time under the same traffic control situation are counted, and a ratio of mid-communication disconnects is obtained by "the number of mid-communication disconnects"/("the number of normal disconnects"+"the number of mid-communication disconnects").

The mid-communication disconnect ratio management table 2211 registers, for each protocol, the ratio of mid-communication disconnects occurring in the band reduction unperformed state without pacing being performed and the ratio of mid-communication disconnects occurring when a band is reduced to a pacing threshold being a band when the pacing processing is applied.

In this way, the statistical information management unit 221 executes calculation of the ratio of mid-communication disconnects on the accumulated disconnect information at any time at predetermined timing, and updates the mid-communication disconnect ratio management table 2211 (S214). Note that data for the latest week may be accumulated in the mid-communication disconnect ratio management table 2211.

An example of a content of the mid-communication disconnect ratio management table 2211 in FIG. 8 indicates that the HTTP has the ratio of mid-communication disconnects of 10% in the state without pacing control and has the ratio of mid-communication disconnects of 30% when pacing is performed with a pacing threshold of 500 kbps.

The same information is indicated for the other protocols. The HTTPS has the ratio of mid-communication disconnects of 5% in the state without pacing control and has the ratio of mid-communication disconnects of 40% when pacing is performed with a pacing threshold of 1 Mbps. The FTP has the ratio of mid-communication disconnects of 6% in the state without pacing control and has the ratio of mid-communication disconnects of 16% when pacing is performed with a pacing threshold of 2 Mbps.

Subsequently, the statistical information calculation unit 222 calculates a degree of user dissatisfaction on the basis of the ratio of mid-communication disconnects managed in the mid-communication disconnect ratio management table 2211 by the statistical information management unit 221, and generates the user dissatisfaction degree table 2221.

Figure 9:
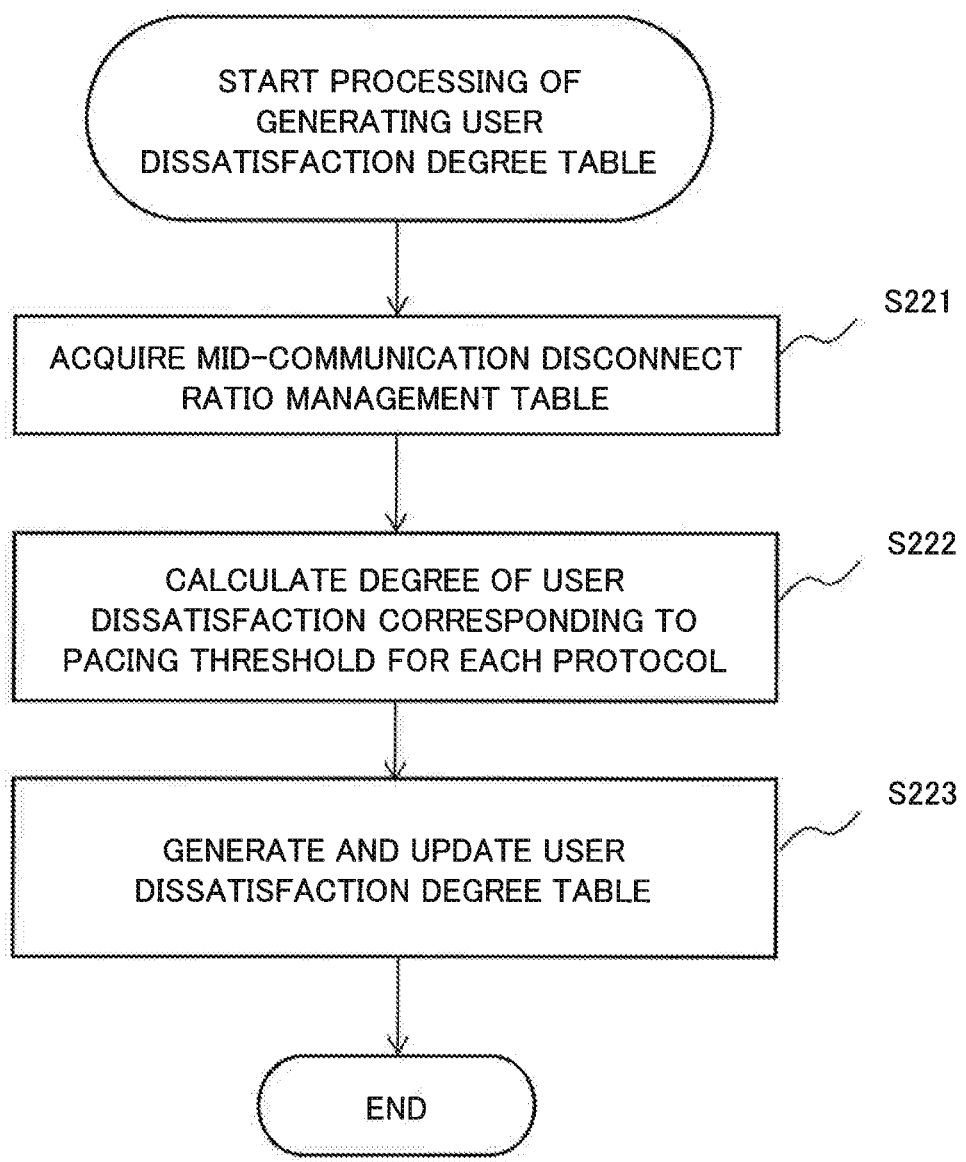
FIG. 9 is a flowchart for describing processing of generating a user dissatisfaction degree table.

FIG. 9 is a flowchart for describing processing of generating a user dissatisfaction degree table. FIG. 10 is a diagram exemplifying a content of the user dissatisfaction degree table 2221.

The statistical information calculation unit 222 calculates a degree of user dissatisfaction on the basis of the ratio of mid-communication disconnects corresponding to the traffic control situation at the occurrence of the disconnect managed in the mid-communication disconnect ratio management table 2211.

First, the statistical information calculation unit 222 acquires information about the mid-communication disconnect ratio management table 2211 managed by the statistical information management unit 221 (S221).

The statistical information calculation unit 222 calculates, for each protocol, a degree of user dissatisfaction corresponding to a pacing threshold managed in the mid-communication disconnect ratio management table 2211 (S222).

For example, in the example illustrated in FIG. 8, the degree of user dissatisfaction at the pacing threshold of 500 kbps of the HTTP becomes "20". Similarly, the degree of user dissatisfaction at the pacing threshold of 1 Mbps of the HTTPS becomes "35", and the degree of user dissatisfaction at the pacing threshold of 2 Mbps of the FTP becomes "10".

Herein, statistical processing may be performed when a plurality of pacing thresholds correspond to the same degree of user dissatisfaction in the compilation of the calculated degrees of user dissatisfaction and the pacing thresholds. For example, an average value or a minimum value of the plurality of corresponding pacing thresholds may be a pacing threshold corresponding to the degree of user dissatisfaction.

In this way, the degree of user dissatisfaction is calculated on the basis of the registered information in the mid-communication disconnect ratio management table 2211.

Subsequently, with the calculated degree of user dissatisfaction as an entry, the statistical information calculation unit 222 registers a pacing threshold corresponding to the degree of user dissatisfaction of each protocol, and generates the user dissatisfaction degree table 2221 (S223).

The example of the content of the user dissatisfaction degree table 2221 in FIG. 10 indicates that a pacing threshold in each protocol corresponding to the degree of user dissatisfaction of "10" is 1.5 Mbps for the HTTP, 2 Mbps for the FTP, and 2.4 Mbps for the HTTPS. In other words, it indicates that the degree of user dissatisfaction is "10" when pacing is performed with 1.5 Mbps for the HTTP, 2 Mbps for the FTP, and 2.4 Mbps for the HTTPS. The other degrees of user dissatisfaction are read in the same way.

In other words, the user dissatisfaction degree table 2221 associates the calculated degree of user dissatisfaction with the pacing threshold corresponding to the degree of user dissatisfaction of each protocol, and registers the degree of user dissatisfaction and the pacing threshold.

Further, the statistical information calculation unit 222 acquires, at any time with a predetermined frequency, the mid-communication disconnect ratio management table 2211 updated and managed by the statistical information management unit 221, calculates a degree of user dissatisfaction, and updates the content of the user dissatisfaction degree table 2221 (S223). For example, the user dissatisfaction degree table 2221 may be updated once a day.

In the processing of optimizing a traffic, congestion of a communication network can be avoided by applying the pacing processing, but frequency of the mid-communication disconnect as user's behavior increases. To obtain an optimum value of a trade-off between avoidance of the congestion and the frequency of the occurrence of the mid-communication disconnect, the traffic optimization device 20 in the present example embodiment manages a relation between a pacing threshold being a band when the pacing processing is applied and a degree of user dissatisfaction defined by the ratio of mid-communication disconnects in the user dissatisfaction degree table. Furthermore, the traffic optimization device 20 in the present example embodiment is configured to be able to manage a correspondence between a degree of user dissatisfaction and a pacing threshold for each protocol and easily acquire a pacing threshold for each protocol providing the same degree of user dissatisfaction.

Next, operations of monitoring an upper limit of a stipulated band permitted in a system, determining a pacing threshold, and executing pacing processing by the pacing processing unit 213 of the call processing unit 210 will be described with reference to FIGS. 11 and 12.

Figure 11:
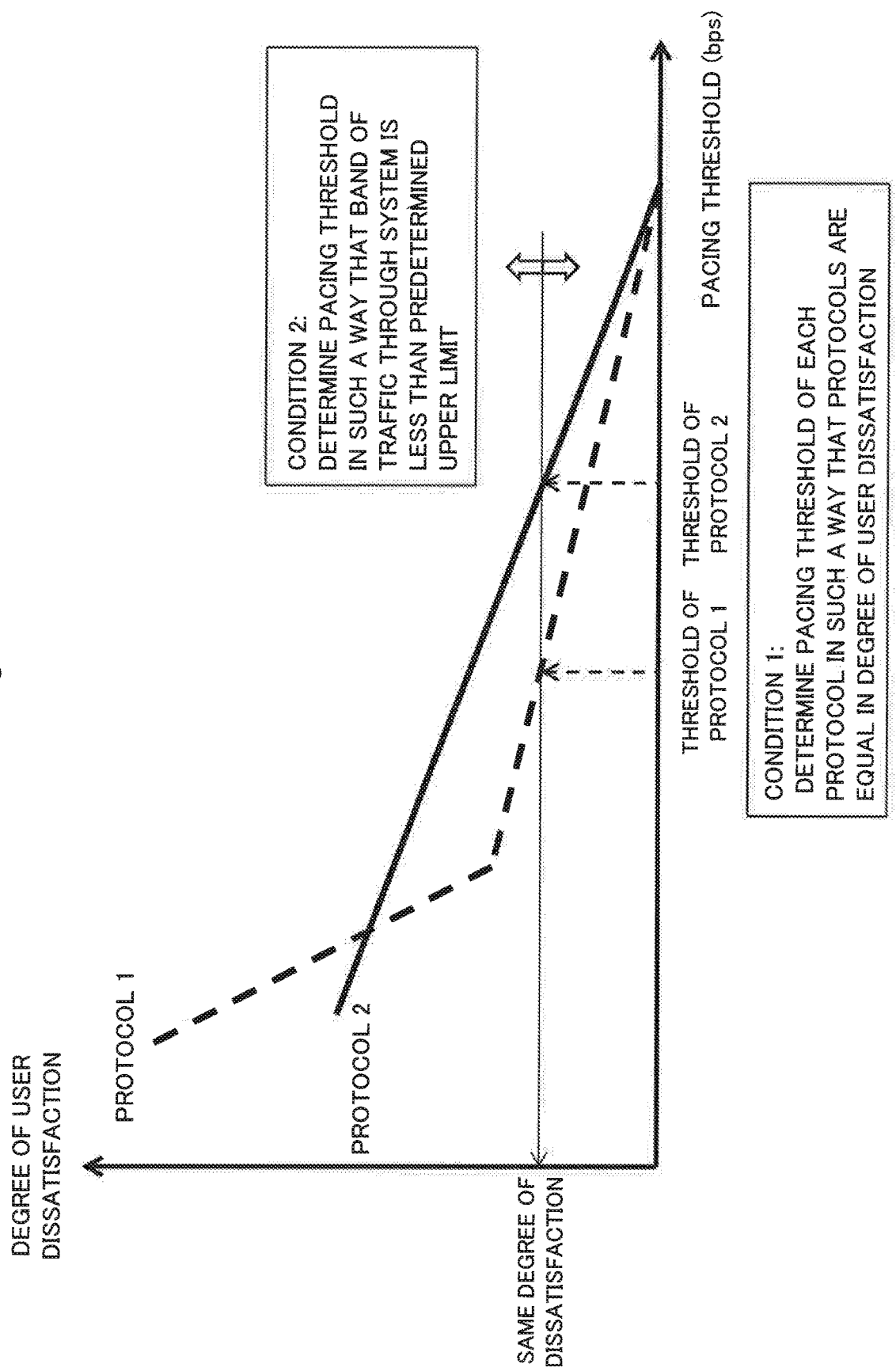
FIG. 11 is a diagram for describing an outline of processing of determining a pacing threshold.

FIG. 11 is a diagram for describing an outline of processing of determining a pacing threshold.

Figure 12:
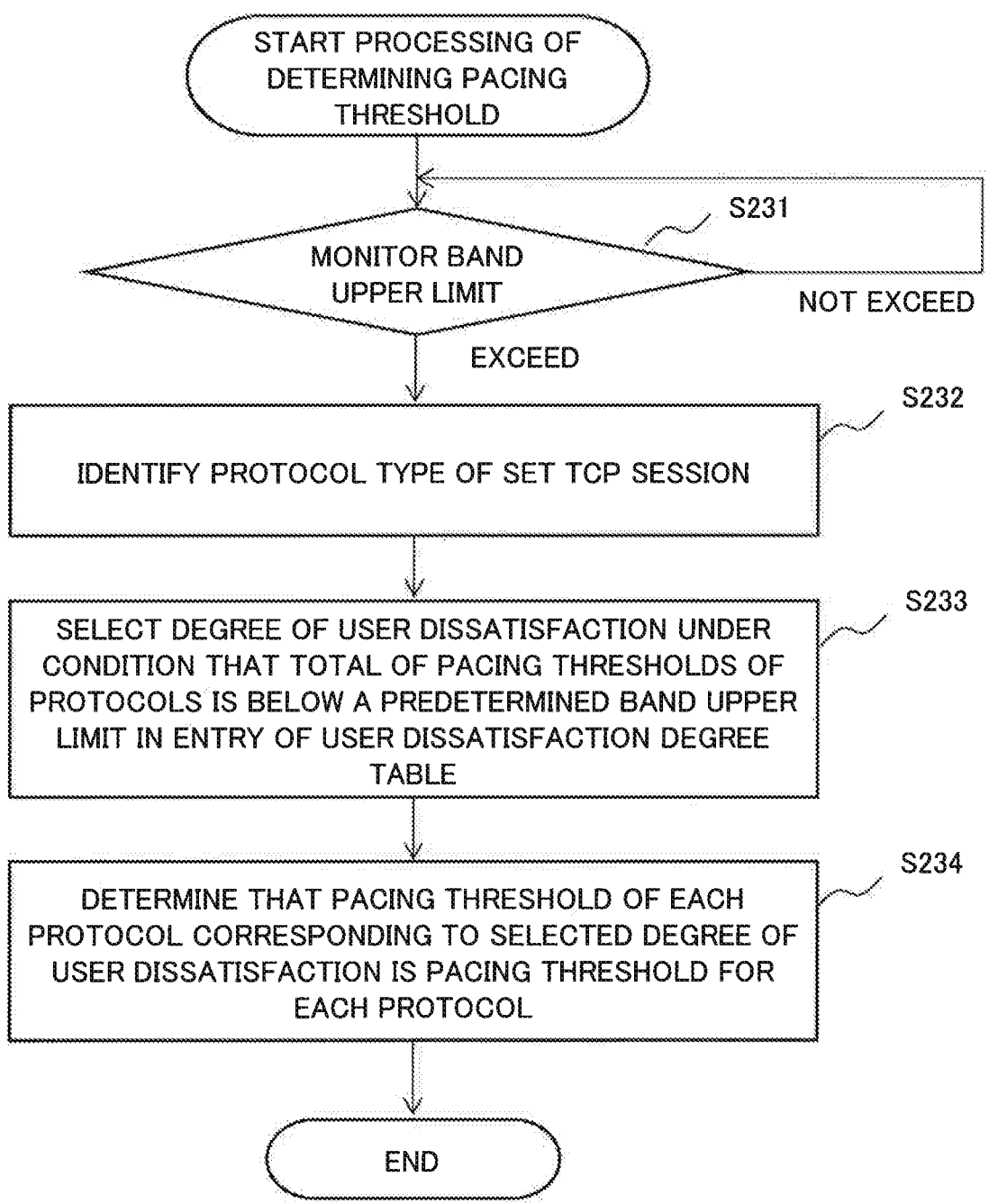
FIG. 12 is a flowchart for describing the processing of determining a pacing threshold.

FIG. 12 is a flowchart for describing the processing of determining a pacing threshold.

The traffic optimization device 20 in the present example embodiment determines a pacing threshold without a bias in a stress applied to each of users using different protocols. Therefore, when determining a pacing threshold, the traffic optimization device 20 determines a pacing threshold in such a way that a degree of user dissatisfaction is the same for any protocol.

For example, when a pacing threshold and a degree of user dissatisfaction have a correspondence as illustrated in FIG. 11 for each protocol, a pacing threshold of a protocol 1 and a pacing threshold of a protocol 2 are determined in such a way that the protocols are equal in a degree of user dissatisfaction as a condition 1. Further, at this time, as a condition 2, the pacing threshold of the protocol 1 and the pacing threshold of the protocol 2 also need to be determined in such a way that a sum total thereof does not exceed an upper limit of a band permitted in the system. In other words, while considering that the total of the pacing thresholds does not exceed a predetermined upper limit according to the number of TCP sessions and a type of the protocols at that time being targets of the pacing processing, the pacing thresholds are determined in such a way that the protocols are equal in a degree of user dissatisfaction.

The processing of determining a pacing threshold executed by the pacing processing unit 213 will be described with reference to FIG. 12.

The pacing processing unit 213 monitors a flow rate of packets flowing through the packet transmit/receive unit 211 in such a way that the flow rate does not exceed an upper limit of a band stipulated in a system (S231). For example, it is assumed that the pacing control is set to start when the flow rate of the packets reaches 90% of the upper limit of the band permitted in the system. In this case, 90% of the upper limit of the band permitted in the system is referred to as a band upper limit of a monitor target.

When the flow rate of the packets exceeds the upper limit of the monitored band (EXCEED in S231), the pacing processing unit 213 determines a pacing threshold for each protocol, and performs the pacing control in such a way that the flow rate of the packets flowing through each TCP session does not exceed the pacing threshold.

First, the pacing processing unit 213 identifies a type of the protocol of the set TCP session being a target of the pacing control (S232). As described above, the session monitoring unit 212 may acquire information about the type of the protocol identified from the port number.

Subsequently, the pacing processing unit 213 acquires information about the user dissatisfaction degree table 2221 managed by the statistical information management unit 222 of the statistical information processing unit 220.

The pacing processing unit 213 selects a degree of user dissatisfaction under a condition that a total of pacing thresholds of protocols is below the band upper limit of the monitor target in the entry of the user dissatisfaction degree table 2221 (S233). This is determined from the total of the pacing thresholds of the protocols managed in the user dissatisfaction degree table 2221 according to the number of TCP sessions and a type of the protocol being targets of the pacing protocol.

For example, it is assumed that the band upper limit of the monitor target is 10 Mbps. Then, it is assumed that a type of a protocol being a target of the pacing control and the number of TCP sessions of the protocol are not used in the HTTPS, the HTTP has four sessions, and the FTP has three sessions. At this time, a total of the pacing thresholds of the protocols is 1.5 Mbps×4+2 Mbps×3=12 Mbps to satisfy the degree of user dissatisfaction of "10", and cannot be below the band upper limit (10 Mbps) of the monitor target. Then, a total of the pacing thresholds of the protocols is 1 Mbps×4+1.8 Mbps×3=9.4 Mbps by lowering the degree of user dissatisfaction to "15", and can be below the band upper limit (10 Mbps) of the monitor target. Thus, the pacing processing unit 213 selects "15" as the degree of user dissatisfaction being applied.

The pacing processing unit 213 determines that the pacing threshold for the HTTP corresponding to the selected degree of user dissatisfaction of "15" is 1 Mbps and the pacing threshold for the FTP is 1.8 Mbps (S234).

Then, the pacing processing unit 213 performs the pacing control by using the determined pacing threshold to lower a packet flow rate of each session to less than or equal to the pacing threshold of the corresponding protocol when the packet flow rate reaches the pacing threshold. The control of the packet flow rate is performed by using, for example, a token bucket method.

As described above, in the present example embodiment, when a flow rate of packets flowing through the packet transmit/receive unit 211 exceeds a band upper limit of a monitor target, a pacing threshold is reduced and an upper limit of throughput between the user terminal 30 and the traffic optimization device 20 is reduced. At this time, a pacing threshold is determined in such a way as not to exceed the band upper limit of the monitor target and as to cause a degree of user dissatisfaction to be the same in protocols on the basis of a correspondence between the degree of user dissatisfaction and the pacing threshold of each of the protocols managed in the user dissatisfaction degree table 2221.

Note that, although not being illustrated, the pacing processing unit 213 can set a pacing threshold again to lower a degree of user dissatisfaction when the flow rate of the packets flowing through the packet transmit/receive unit 211 is below the band upper limit of the monitor target by a predetermined value.

The traffic optimization device 20 in the above-described present example embodiment will be described in terms of transmission and reception of a signal between a related device and the traffic optimization device 20.

Figure 13:
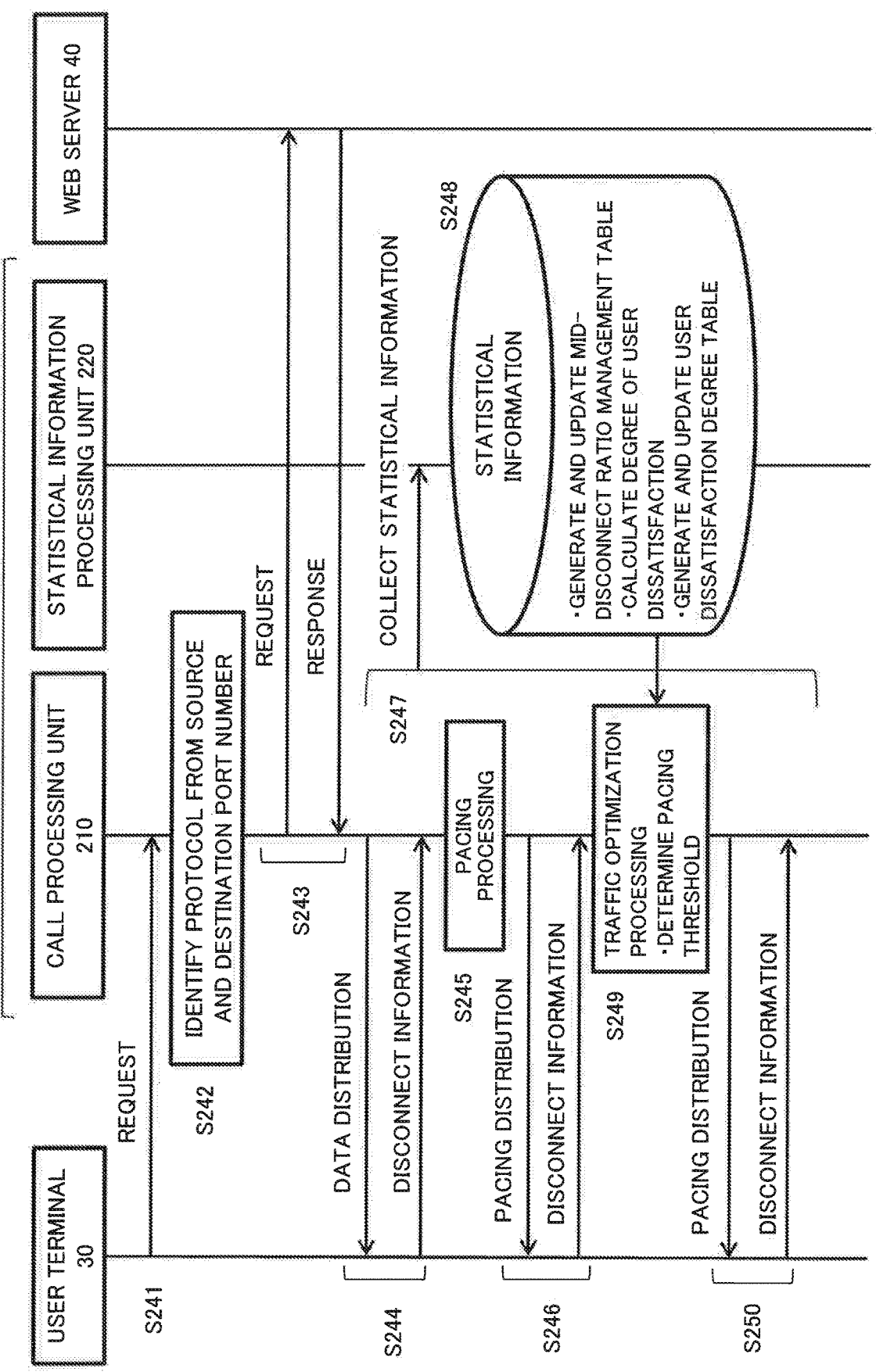
FIG. 13 is a sequence diagram exemplifying an outline of transmission and reception of a signal between the traffic optimization device according to the second example embodiment of the present invention and a related device and internal processing.

FIG. 13 is a sequence diagram exemplifying an outline of transmission and reception of a signal between the traffic optimization device according to the second example embodiment and the related device and internal processing.

Upon start of a TCP session, the user terminal 30 transmits a request for session setting to the call processing unit 210 of the traffic optimization device 20 (S241).

The call processing unit 210 identifies a type of a protocol from a source and a destination port number included in the request (S242). Subsequently, the call processing unit 210 transmits the request for the session setting to the Web server 40 at the other end of communication and receives a response thereof (S243).

The call processing unit 210 relays the data transmitted from the Web server 40 and distributes the data to the user terminal 30. Then, the call processing unit 210 receives disconnect information from the user terminal 30, and the session is terminated (S244). The disconnect information is a normal disconnect or a mid-communication disconnect due to user's behavior. Then, the disconnect information is transmitted as statistical information when pacing has not been performed to the statistical information processing unit 220 (S247)

Further, the call processing unit 210 performs pacing processing as needed to control a packet flow rate (S245). The pacing processing performed herein is not limited to the pacing processing in the above-described present example embodiment, and may be pacing processing by using an arbitrarily set pacing threshold.

The call processing unit 210 performs pacing distribution on the user terminal 30 with throughput having the set pacing threshold as an upper limit. Then, the call processing unit 210 receives disconnect information from the user terminal 30, and the session is terminated (S246). The disconnect information is a normal disconnect or a mid-communication disconnect due to user's behavior. Also in this case, the disconnect information is transmitted as statistical information to the statistical information processing unit 220 (S247). Note that, at this time, information about the applied pacing threshold is also transmitted as the statistical information.

The statistical information processing unit 220 generates the above-described mid-communication disconnect ratio management table on the basis of the statistical information collected at any time as described above, and further calculates a degree of user dissatisfaction and generates the user dissatisfaction degree table (S248).

When the user dissatisfaction degree table is generated, the call processing unit 210 executes the traffic optimization processing in the present example embodiment (S249). In other words, a pacing threshold is determined in such a way as not to exceed a band upper limit of a monitor target and as to cause a degree of user dissatisfaction to be the same in each protocol.

The call processing unit 210 performs the pacing distribution on the user terminal 30 by using the pacing threshold set for the traffic optimization processing. Then, the call processing unit 210 receives disconnect information from the user terminal 30, and the session is terminated (S250). The disconnect information is a normal disconnect or a mid-communication disconnect due to user's behavior. Also in this case, the disconnect information is transmitted as statistical information to the statistical information processing unit 220, and is used to update the mid-communication disconnect ratio management table and the user dissatisfaction degree table (S247).

As described above, the traffic optimization device 20 acquires the disconnect information for each protocol and each pacing threshold as statistical information, calculates a ratio of mid-communication disconnects for each protocol and each pacing threshold, and generates the mid-communication disconnect ratio management table. Furthermore, the traffic optimization device 20 calculates a degree of user dissatisfaction by using the information registered in the mid-communication disconnect ratio management table, and generates statistical information about the pacing threshold and the degree of user dissatisfaction of each protocol as the user dissatisfaction degree table. When performing the pacing processing, the traffic optimization device 20 determines a pacing threshold in such a way as not to exceed a band upper limit of a monitor target and as to cause a degree of user dissatisfaction to be the same in each protocol on the basis of a content of the user dissatisfaction degree table. The disconnect information for each protocol and each pacing threshold in the result of the pacing processing executed in such a manner is also fed back as the statistical information and is used to update the mid-communication disconnect ratio management table and the user dissatisfaction degree table.

In this way, the traffic optimization device 20 in the present example embodiment updates the mid-communication disconnect ratio management table and the user dissatisfaction degree table at any time for determining a pacing threshold based on the statistical information. Therefore, when user's behavior changes, a pacing threshold can be dynamically changed in accordance with the change.

FIG. 14 is a diagram for describing a situation where a pacing threshold needed to be set is changed with a change in a service in a protocol.

When trends of a service and a content in a protocol change, user's behavior changes in accordance with the change, so that statistical information is also more likely to change. For example, when a moving image used in streaming playback achieves high image quality and an amount of data increases, reducing throughput with the same pacing threshold as a conventional pacing threshold may lower a distribution rate to less than a bit rate of the moving image. In such a case, a user's stress abruptly increases, thereby leading to an increase in frequency of mid-communication disconnects. Thus, contents of the mid-communication disconnect ratio management table and the user dissatisfaction degree table change in accordance with the user's behavior being fed back.

The example of FIG. 14 illustrates that a degree of user dissatisfaction tends to increase without more throughput when a content of a service of a protocol 1 changes. In other words, when a pacing threshold is determined in such a way as to cause a degree of user dissatisfaction to be the same as that of a protocol 2, a threshold M that is sufficient before the service change needs to be increased to a threshold N after the service change.

In this way, a pacing threshold for each protocol is determined by using the management table to which statistical information is fed back in the present example embodiment, so that a change in the market can be handled immediately, and an optimum pacing threshold can be always determined.

As described above, in the present example embodiment, a degree of user dissatisfaction is defined by statistically grasping a pacing threshold being a band when pacing is applied and a ratio of mid-communication disconnects at that time. Then, when pacing is applied, a pacing threshold for each application is determined by using the degree of user dissatisfaction. In other words, the defined degree of user dissatisfaction is grasped for each protocol, and the pacing threshold when pacing is applied is determined in such a way that a degree of user dissatisfaction is the same in any protocol. Thus, in the present example embodiment, control can be performed to dynamically set a pacing threshold without a bias in a stress applied to each of users using different application protocols.

Although the claimed invention has been described with reference to the example embodiments, it should be understood that the claimed invention is not limited to the above-mentioned example embodiments. Various modifications that can be understood by those skilled in the art within the scope of the claimed invention may be applied to the configuration and the details of the claimed invention.

This application is based upon and claims the benefit of priority from Japanese patent application No. 2016-031164, filed on Feb. 22, 2016, the disclosure of which is incorporated herein in its entirety by reference.

REFERENCE SIGNS LIST 10, 20 Traffic optimization device
30 User terminal
40 Web server
101 Call processing means
102 Statistical information processing means
210 Call processing unit
211 Packet transmit/receive unit
212 Session monitoring unit
213 Pacing processing unit
220 Statistical information processing unit
221 Statistical information management unit
222 Statistical information calculation unit
2211 Mid-communication disconnect ratio management table
2221 User dissatisfaction degree table

What is claimed is:

1. A traffic optimization device comprising:
a processor;
a non-transitory computer-readable data storage medium storing program code executable by the processor to realize:
    a statistical information processing unit that acquires statistical information on mid-communication disconnected from the user terminals before communication by the application protocols end and, stores the statistical information as a mid-disconnection ratio management table, calculates a degree of user dissatisfaction with each application protocol, based on the mid-disconnection ratio stored in the mid-disconnection ratio management table, and stores a pacing threshold corresponding to the degree of user dissatisfaction with each application protocol in a user dissatisfaction degree table; and
    a call processing unit that finds pacing thresholds in which the degree of user dissatisfaction matches between each application protocol and the sum of the pacing thresholds does not exceed a predetermined band upper limit, and executes pacing processing in such a way that a communication traffic for each of the application protocols is below the pacing thresholds found.

2. The traffic optimization device according to claim 1, wherein
the degree of user dissatisfaction is a numerical value obtained by excluding a ratio of mid-communication disconnects occurring in a band reduction unperformed state without pacing being performed from a ratio of mid-communication disconnects occurring when a band is reduced to a pacing threshold being a band when pacing processing is performed, and is an indicator indicating a degree of user dissatisfaction with deterioration of a communication state due to performing the pacing processing.

3. The traffic optimization device according to claim 2, wherein
the call processing unit includes a session monitoring unit configured to output disconnect information including an application protocol type of a session identified by monitoring the session, a disconnect type indicating a normal disconnect or a mid-communication disconnect determined when the session is disconnected, and traffic control situation information applied at a time of the disconnect, and
the statistical information processing unit includes
    a statistical information management unit configured to generate a mid-communication disconnect ratio management table in which a ratio of mid-communication disconnects occurring in a band reduction unperformed state without pacing being performed in the traffic control situation information and a ratio of mid-communication disconnects occurring when a band is reduced to a pacing threshold being a band when pacing processing is applied in the traffic control situation information are registered for each application protocol, based on the disconnect information, and
    a statistical information calculation unit configured to calculate the degree of user dissatisfaction, based on registered information in the mid-communication disconnect ratio management table, and generate a user dissatisfaction degree table in which the calculated degree of user dissatisfaction and the pacing threshold corresponding to the degree of user dissatisfaction with each application protocol are associated with each other and registered.

4. The traffic optimization device according to claim 3, wherein
the call processing unit includes a pacing processing unit configured to identify a number of set sessions and an application protocol type when traffic exceeds a band upper limit of a monitor target stipulated in a system, refer to the user dissatisfaction degree table, select the degree of user dissatisfaction under a condition that a total of the pacing thresholds of respective application protocols registered for each of the degrees of user dissatisfaction is below a band upper limit of the monitor target, determine that the pacing threshold of each application protocol registered in association with the selected degree of user dissatisfaction is a pacing threshold for each application protocol, and execute pacing processing.

5. The traffic optimization device according to claim 4, wherein
the mid-communication disconnect ratio management table and the user dissatisfaction degree table are updated at predetermined timing by using the disconnect information output by the session monitoring unit.

6. The traffic optimization device according to claim 3, wherein
the mid-communication disconnect ratio management table and the user dissatisfaction degree table are updated at predetermined timing by using the disconnect information output by the session monitoring unit.

7. A traffic optimization method comprising:
acquiring statistical information on mid-communication by the application protocols end;
calculating a degree of user dissatisfaction with each application protocol, based on the statistical information, and managing a pacing threshold corresponding to the degree of user dissatisfaction for each application protocol;
finding pacing thresholds that match the degree of user dissatisfaction between each application protocol and that the sum of the pacing thresholds does not exceed a predetermined band upper limit; and
executing pacing processing in such a way that a communication traffic for each of the application protocols is below the pacing thresholds found.

8. The traffic optimization method according to claim 7, wherein
the degree of user dissatisfaction is a numerical value obtained by excluding a ratio of mid-communication disconnects occurring in a band reduction unperformed state without pacing being performed from a ratio of mid-communication disconnects occurring when a band is reduced to a pacing threshold being a band when pacing processing is performed, and is an indicator indicating a degree of user dissatisfaction with deterioration of a communication state due to performing the pacing processing.

9. The traffic optimization method according to claim 8, further comprising:
outputting disconnect information including an application protocol type of a session identified by monitoring the session, a disconnect type indicating a normal disconnect or a mid-communication disconnect determined when the session is disconnected, and traffic control situation information applied at a time of the disconnect;
generating a mid-communication disconnect ratio management table in which a ratio of mid-communication disconnects occurring in a band reduction unperformed state without pacing being performed in the traffic control situation information and a ratio of mid-communication disconnects occurring when a band is reduced to a pacing threshold being a band when pacing processing is applied in the traffic control situation information are registered for each application protocol, based on the disconnect information; and
calculating the degree of user dissatisfaction, based on registered information in the mid-communication disconnect ratio management table, and generating a user dissatisfaction degree table in which the calculated degree of user dissatisfaction and the pacing threshold corresponding to the degree of user dissatisfaction with each application protocol are associated with each other and registered.

10. The traffic optimization method according to claim 9, further comprising:
identifying a number of set sessions and an application protocol type when traffic exceeds a band upper limit of a monitor target stipulated in a system;
referring the user dissatisfaction degree table, and selecting the degree of user dissatisfaction under a condition that a total of the pacing thresholds of respective application protocols registered for each of the degrees of user dissatisfaction is below a band upper limit of the monitor target; and
determining that the pacing threshold of each application protocol registered in association with the selected degree of user dissatisfaction is a pacing threshold for each application protocol, and executing pacing processing.

11. The traffic optimization method according to claim 10, wherein
the mid-communication disconnect ratio management table and the user dissatisfaction degree table are updated at predetermined timing by using the disconnect information.

12. The traffic optimization method according to claim 9, wherein
the mid-communication disconnect ratio management table and the user dissatisfaction degree table are updated at predetermined timing by using the disconnect information.

* * * * *